US012191097B2

(12) United States Patent
Sun et al.

(10) Patent No.: US 12,191,097 B2
(45) Date of Patent: Jan. 7, 2025

(54) CIRCUIT BREAKER

(71) Applicant: SENSATA TECHNOLOGIES CHANGZHOU CO., LTD., Changzhou (CN)

(72) Inventors: Wei Sun, Changzhou (CN); Jigang Xu, Changzhou (CN)

(73) Assignee: SENSATA TECHNOLOGIES CHANGZHOU CO., LTD., Changzhou (CN)

( * ) Notice: Subject to any disclaimer, the term of this patent is extended or adjusted under 35 U.S.C. 154(b) by 106 days.

(21) Appl. No.: 17/985,010

(22) Filed: Nov. 10, 2022

(65) Prior Publication Data

US 2023/0178321 A1 Jun. 8, 2023

(30) Foreign Application Priority Data

Nov. 12, 2021 (CN) .......................... 202111337115.6

(51) Int. Cl.
*H01H 71/10* (2006.01)

(52) U.S. Cl.
CPC .................................. *H01H 71/10* (2013.01)

(58) Field of Classification Search
CPC .... H01H 71/10; H01H 85/0241; H01H 9/106; H01H 2039/008; H01H 39/006; H01H 33/664
USPC ...................................................... 200/61.08
See application file for complete search history.

(56) References Cited

U.S. PATENT DOCUMENTS 7,182,012 B2 * 2/2007 Brede .................. B23D 15/145 89/1.14
11,784,021 B2 * 10/2023 Shi ......................... H01H 85/10 337/121

FOREIGN PATENT DOCUMENTS

| | | | |
|---|---|---|---|
| CN | 112447462 | A | 3/2021 |
| DE | 102004023415 | A1 | 3/2005 |
| JP | 2014049272 | A | 3/2014 |
| WO | 2019224469 | A1 | 11/2019 |

OTHER PUBLICATIONS

Extended European Search Report, EP22207062.5, Apr. 24, 2023, 8 pages.

* cited by examiner

*Primary Examiner* — Lheiren Mae A Caroc
(74) *Attorney, Agent, or Firm* — Mark H. Williams

(57) ABSTRACT

The present application relates to a circuit breaker comprising a cut-off mechanism configured to cut off a conductor extending through the circuit breaker. The cut-off mechanism includes a primary cut-off mechanism and a secondary cut-off mechanism, and the cut-off mechanism comprises a primary operation phase and a secondary operation phase. In the primary operation phase, the primary cut-off mechanism slides along the secondary cut-off mechanism to execute primary cutting operations, and in the secondary operation phase, the primary cut-off mechanism drives the secondary cut-off mechanism to execute secondary cutting operations.

13 Claims, 5 Drawing Sheets

CIRCUIT BREAKER

TECHNICAL FIELD

The present application relates to a circuit breaker which can form a plurality of cutouts on a conductor extending through the circuit breaker.

BACKGROUND ART

Circuit overcurrent protection products are based on fuses to be blown with heat generated by current flowing through the fuses, which involves the main problem of matching relations between thermal fuses and loads. For example, in the case where a main circuit of a new energy vehicle is required to be protected, as for the load, in the case where a low power overload or short circuit occurs, selecting a fuse of low current specifications cannot satisfy the requirement of short time current overshoot situation, and selecting a fuse of high current specifications cannot satisfy the requirement of rapid protection. As for the lithium battery pack providing energy for new energy vehicles currently, in the case where a short circuit occurs, the output current is about several times of rated current, such that protection time of the fuse cannot satisfy the requirement, leading to heating, firing and burning of the battery pack. Due to the fact that both heating of withstand current and melting caused by heating of current to be cut off are caused by current flowing through the fuse, this kind of protection elements making use of fusing via current heating cannot achieve a breaking speed that is rapid sufficiently for a fault current of a certain amplitude under the condition of higher rated current or short-time overload/impulse current of strong tolerance (such as the short time high current during starting or climbing of an electric vehicle), or cannot realize higher rated current or withstand larger overload/impulse current without being damaged under the condition that the protection speed is rapid sufficiently for a fault current of a certain amplitude.

At present, a cut-off cutout structure for rapid breaking has already been provided in the market. It mainly comprises an electronic ignition device, a conductive plate, and an accommodation cavity for the conductive plate fallen off. The electronic ignition device generates high pressure gas to drive a power plant to punch out the conductive plate. The broken conductive plate falls off to the accommodation cavity, such that the purpose of rapid breaking of circuit can be realized. However, there are still some shortcomings and defects to result in limited arc extinguishing capacity: Due to a single cutout being provided, the arc extinguishing capacity is relatively low, such that it is difficult to break a high fault current.

SUMMARY

One of objects of the present application is providing a circuit breaker which can overcome at least one defect in the prior art.

One of objects of the present application is providing a circuit breaker which can provide a plurality of cutouts.

Another object of the present application is providing a circuit breaker having high arc extinguishing capacity and breaking capacity.

Another object of the present application is providing a circuit breaker with a compact structure, and simple assembling, installation and operations.

According to one aspect of the present application, a circuit breaker is provided, wherein the circuit breaker comprises a cut-off mechanism configured to cut off a conductor extending through the circuit breaker, wherein the cut-off mechanism comprises a primary cut-off mechanism and a secondary cut-off mechanism, and the cut-off mechanism comprises a primary operation phase in which the primary cut-off mechanism slides along the secondary cut-off mechanism and a secondary operation phase in which the primary cut-off mechanism drives the secondary cut-off mechanism to move.

Since the primary cut-off mechanism can slide along the secondary cut-off mechanism and drive the secondary cut-off mechanism to move, that is, the primary cut-off mechanism and the secondary cut-off mechanism are interrelated closely, the structure of the whole cut-off mechanism is compact, and its machining process is simple. Simultaneously, functions such as multiple point cutting, sequential cutting can be realized as well to improve high arc extinguishing and breaking capacity.

According to some embodiments of the present application, the secondary cut-off mechanism is provided with a sliding chamber. In the primary operation phase, the primary cut-off mechanism slides in the sliding chamber. The structure becomes more compact by accommodating the primary cut-off mechanism in the secondary cut-off mechanism. Meanwhile, it is not required to take up additional space in other positions inside the circuit breaker. Sliding of the primary cut-off mechanism relative to the secondary cut-off mechanism also provides a mechanical mechanism for multiple point cutoff and sequential cutoff.

According to some embodiments of the present application, the primary cut-off mechanism is provided with a sliding surface, and the secondary cut-off mechanism is provided with a sliding surface. In the primary operation phase, the sliding surface of the primary cut-off mechanism slides along the sliding surface of the secondary cut-off mechanism. Except for realizing sliding, existence of the sliding surfaces further can play a guiding role to ensure the primary cut-off mechanism sliding in the longitudinal direction without deviation.

According to some embodiments of the present application, a direction in which the primary cut-off mechanism slides along the secondary cut-mechanism is consistent with a direction in which the primary cut-off mechanism drives the secondary cut-off mechanism. At the same time of realizing multiple point cutoff and sequential cutoff, the structure of the cut-off mechanism is simplified, and accuracy requirements of manufacturing, installation and operations of the cut-off mechanism are reduced.

According to some embodiments of the present application, one end of the primary cut-off mechanism is provided with a flange, and one end of the secondary cut-off mechanism is provided with a shoulder. In the secondary operation phase, the flange abuts against and pushes the shoulder to make the primary cut-off mechanism drive the secondary cut-off mechanism. When the flange and the shoulder contact and cooperate with each other, the top of the primary cut-off mechanism can be substantially flush with the top of the secondary cut-off mechanism in the transverse direction, such that the structure of the cut-off mechanism can be more compact, which further saves installation space and movement space required by the cut-off mechanism.

According to some embodiments of the present application, the primary cut-off mechanism is provided with a primary cutting portion. In the primary operation phase, the primary cutting portion cuts off the conductor at a primary cut-off point of the conductor.

According to some embodiments of the present application, a fuse body is connected in parallel across the primary cut-off point of the conductor. Arrangement of the fuse body improves arc extinguishing capacity of the circuit breaker significantly.

According to some embodiments of the present application, the secondary cut-off mechanism is provided with a secondary cutting portion. In the secondary operation phase, the secondary cutting portion cuts off the conductor at secondary cut-off points of the conductor.

According to some embodiments of the present application, the secondary operation phase includes a first secondary operation phase and a second secondary operation phase, and the secondary cut-off mechanism is provided with a first secondary cutting portion and a second secondary cutting portion. In the first secondary operation phase, the first secondary cutting portion cuts off the conductor at a first secondary cut-off point, and in the second secondary operation phase, the second secondary cutting portion cuts off the conductor at a second secondary cut-off point.

According to some embodiments of the present application, the circuit breaker comprises a housing provided with an actuation cavity and an operation cavity, wherein the conductor extends through the operation cavity.

According to some embodiments of the present application, the cut-off mechanism is accommodated in the operation cavity, wherein the primary cut-off mechanism and the secondary cut-off mechanism are located on the same side of the conductor, which is consistent with the purpose of realizing the desired compact structure in the present application.

According to some embodiments of the present application, an actuation mechanism is accommodated in the actuation cavity, and the actuation mechanism is configured to generate a force applied to the primary cut-off mechanism of the cut-off mechanism to push the primary cut-off mechanism to move in response to an actuation signal.

According to some embodiments of the present application, the operation cavity comprises a first section and a second section. In the primary operation phase, the primary cut-off mechanism slides along an inner wall of the first section, and in the secondary operation phase, the secondary cut-off mechanism slides along an inner wall of the second section.

According to some embodiments of the present application, a direction in which the primary cut-off mechanism slides along the inner wall of the first section is consistent with a direction in which the secondary cut-off mechanism slides along the inner wall of the second section. At the same time of realizing multiple point cutoff and sequential cutoff, the structure of the cut-off mechanism is simplified, and accuracy requirements of manufacturing, installation and operations of the cut-off mechanism are reduced.

BRIEF DESCRIPTION OF THE DRAWINGS

Multiple aspects of the present application will be better understood from the detailed description in the following text in conjunction with the accompanying drawings, in which.

DETAILED DESCRIPTION

Figure 1:
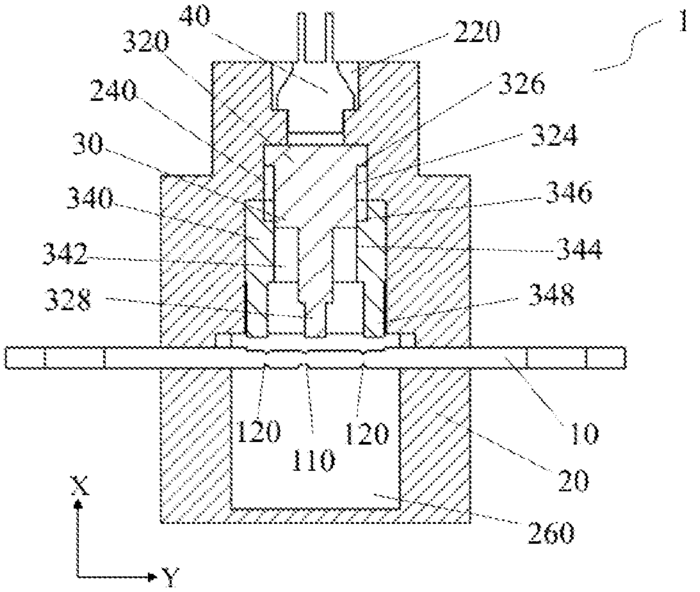
FIG. 1, which is a sectional view of a circuit breaker according to one embodiment in the present application, shows a cut-off mechanism in an initial position.

The present application will be described below with reference to the accompanying drawings, wherein several embodiments of the present application are shown in the drawings. However, it should be understood that the present application can be represented in many different forms and is not limited to embodiments described in the following text. In fact, embodiments described in the following text aim at making disclosure of the present application be more complete and fully explaining the protection scope of the present application. It should be further understood that embodiments disclosed in this text can be combined in various manners, such that more additional embodiments can be provided.

It should be understood that, in all the drawings, the same reference sign indicates the same element. In the accompanying drawings, for the sake of clarity, sizes of some features can be varied.

It should be understood that, expressions in the specification are merely used for describing specific embodiments and do not aim at limiting the present application. Unless otherwise defined, all terms (including technical and scientific terms) used in the specification have the meanings commonly understood by one of ordinary skill in the art. To be brief and/or clear, well-known functions or structures are not explained in details any more.

Unless clearly defined, all singular forms "one", "said" and "the" used in the specification include plural forms. Expressions "comprise", "include" and "have" used in the specification indicate that the alleged features are provided without excluding existence of one or more other features. The expression "and/or" used in the specification includes one or more optional or all combinations of relevant listed items. Expressions "between X and Y" and "between about X and Y" used in the specification should be explained as including X and Y. The expression "between about X and Y"

used in the specification means "between about X and about Y", and the expression "from about X to Y" used in the specification means "from about X to about Y".

In the specification, when it is called that one element is located "on" another element, "attached to" another element, "connected to" another element, "coupled to" another element, or "in contact with" another element etc., the element can be directly located on another element, attached to another element, connected to another element, coupled to another element, in contact with another element, or an intermediate element can be provided. By contrast, when it is called that one element is "directly" located "on" another element, "directly attached to" another element, "directly connected to" another element, "directly coupled to" another element, or "directly in contact with" another element, there will be no intermediate element. In the specification, one feature being arranged to "adjacent to" another feature can indicate that one feature has a portion overlapped with the adjacent feature or a portion located above or below the adjacent feature.

In the specification, expressions for spatial relations such as "above", "below", "left", "right", "front", "back", "high", "low" etc. can explain relations between one feature and another feature in the drawings. It should be understood that expressions of spatial relations not only include locations as shown in the drawings, but also include different locations of the device in use or operation. For example, when the device in the drawings is inverted, the feature originally described to be "below" another feature can be described as being "above" said another feature at this moment. The device can also be oriented in other manners (rotating by 90 degrees or in another location). At this moment, relative spatial relations should be explained correspondingly.

Figure 2:
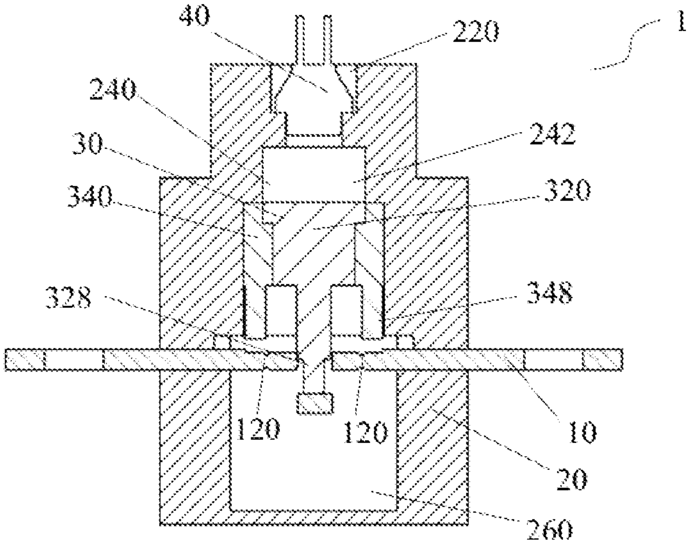
FIG. 2, which is a sectional view of a circuit breaker according to one embodiment of the present application, shows a primary operation phase.
Figure 3:
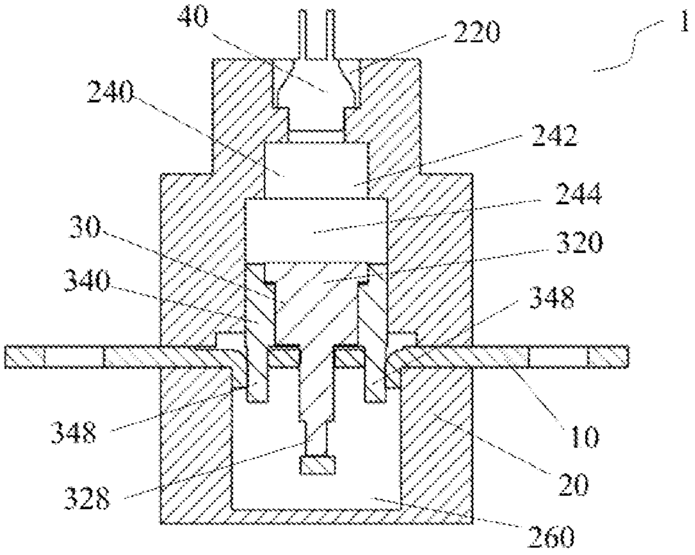
FIG. 3, which is a sectional view of a circuit breaker according to one embodiment of the present application, shows a secondary operation phase.

A circuit breaker 1 according to some embodiments of the present application will be described below with reference to the accompanying drawings. As shown in FIGS. 1-3, a circuit breaker 1 according to some embodiments of the present application is shown. A conductor 10 of a circuit protected by the circuit breaker 1 extends through the circuit breaker 1, such that when a fault occurs, the circuit breaker 1 can cut off the conductor 10, so as to break off the circuit to protect the circuit.

To facilitate illustration and explanation, X and Y directions are marked in the accompanying drawings, wherein the X direction corresponds to the longitudinal direction of the circuit breaker 1, and the Y direction corresponds to the transverse direction of the circuit breaker 1.

With reference to FIG. 1, it shows a sectional view of a circuit breaker 1 according to some embodiments of the present application. The circuit breaker 1 comprises a housing 20, a cut-off mechanism 30 and an actuation mechanism 40. Both the cut-off mechanism 30 and the actuation mechanism 40 are accommodated in the housing 20. A conductor 10 extends through the housing 20. For example, in the embodiment as shown in the figure, the conductor 10 extends substantially in the transverse direction through the housing 20.

The circuit breaker 1 according to the present application cuts off the conductor 10 via the cut-off mechanism 30. Namely, the cut-off mechanism 30 is configured to cut off the conductor 10 extending through the circuit breaker 1, so as to break off the circuit when a fault in the circuit occurs or in other cases where it is required to break off the circuit.

Generally, when the cut-off mechanism 30 cuts off the conductor 10, it is only required to form one cutout to break off the circuit. Thus, such a manner is adopted for most products in the prior art, i.e. the cut-off mechanism is only used for forming a single cutout on the conductor. However, in the case where a single cutout is formed by the cut-off mechanism, many problems may occur. For instance, arc extinguishing capacity of a single cutout is relatively weak, and its insulation and voltage resistance grades after breakage are weak, which cannot satisfy requirements of customers.

The inventor has realized the aforementioned problems and found out that forming a plurality of cutouts on the conductor via a cut-off mechanism can solve the problems caused by a single cutout and can improve arc extinguishing capacity and performance after breakage. Besides, relative to a single cutout, after a product, in which a plurality of cutouts can be formed, is triggered, its insulation and voltage resistance properties will be stronger. However, generally, the cut-off mechanism for forming a plurality of cutouts is much more complex than the cut-off mechanism for forming a single cutout. Accordingly, one object of the present application is providing a circuit breaker which can form a plurality of cutouts and has a simple and compact structure and low cost.

To form a plurality of cutouts, the cut-off mechanism 30 may include a primary cut-off mechanism 320 and a secondary cut-off mechanism 340. The primary cut-off mechanism 320 may form cutouts in one or more positions on the conductor 10, and the primary cut-off mechanism 320 may form one or more cutouts in different positions of the conductor 10, thereby forming a plurality of cutouts on the conductor 10. The primary cut-off mechanism 320 and the secondary cut-off mechanism 340 may be configured to simultaneously form a plurality of cutouts on the conductor 10 or may be configured to sequentially form a plurality of cutouts on the conductor 10.

According to some embodiments of the present application, the cut-off mechanism 30 of the circuit breaker 1 may comprise at least two operation phases, such as a primary operation phase and a secondary operation phase. As an important aspect of the present application, the cut-off mechanism 30 of the circuit breaker 1 is configured such that, in the primary operation phase, the primary cut-off mechanism 320 slides along the secondary cut-off mechanism 340, and in the secondary operation phase, the primary cut-off mechanism 320 drives the secondary cut-off mechanism 340 to move.

As shown in the figures, since the primary cut-off mechanism 320 can slide along the secondary cut-off mechanism 340 and drive the secondary cut-off mechanism 340 to move, that is, the primary cut-off mechanism 320 and the secondary cut-off mechanism 340 are interrelated closely, the structure of the whole cut-off mechanism 30 is compact, and its machining process is simple. Simultaneously, functions such as multiple point cutoff, sequential cutoff can be realized as well to improve arc extinguishing and breaking capacity.

In some embodiments of the present application, the secondary cut-off mechanism 340 may be provided with a sliding chamber 342. As shown in the figures, the secondary cut-off mechanism 340 may be a hollow member which is provided with a through opening in the longitudinal direction, thereby forming the sliding chamber 342. The primary cut-off mechanism 320 can be accommodated at least partially in the sliding chamber 342 and can slide in the longitudinal direction in the sliding chamber 342.

Accommodating the primary cut-off mechanism 320 in the secondary cut-off mechanism 340 makes the structure be more compact. Meanwhile, it is not required to take up additional space in other positions inside the circuit breaker 1. Sliding of the primary cut-off mechanism 320 relative to the secondary cut-off mechanism 340 also provides a mechanical mechanism for multiple point cutoff and sequential cutoff.

In some embodiments of the present application, the primary cut-off mechanism 320 may be provided with a sliding surface 324, and the secondary cut-off mechanism 340 may also be provided with a sliding surface 344. When the primary cut-off mechanism 320 moves relative to the secondary cut-off mechanism 340, the sliding surface 324 of the primary cut-off mechanism 320 contacts with the sliding surface 344 of the secondary cut-off mechanism 340) and slides along the sliding surface 344.

Both the sliding surface 324 and the sliding surface 344 extend in the longitudinal direction, so that the primary cut-off mechanism 320 slides in the longitudinal direction relative to the secondary cut-off mechanism 340. Except for realizing sliding, existence of the sliding surface 324 and the sliding surface 344 further can play a guiding role to ensure the primary cut-off mechanism 320 sliding in the longitudinal direction without deviation.

As mentioned above, according to embodiments in the present application, the secondary cut-off mechanism 340 is driven to move by the primary cut-off mechanism 320. Thus, the primary cut-off mechanism 320 may be provided with a portion for driving the secondary cut-off mechanism 340. In some embodiments of the present application, a flange 326 may be formed at one end of the primary cut-off mechanism 320. For example, as shown in FIG. 1, at the top of the primary cut-off mechanism 320, a flange 326 extending outwardly in the transverse direction from the top may be formed. When the primary cut-off mechanism 320 slides in the longitudinal direction relative to the secondary cut-off mechanism 340), the flange 326 will eventually abut against the top of the secondary cut-off mechanism 340). When the primary cut-off mechanism 320 continues to move in the longitudinal direction, the secondary cut-off mechanism 340 is pushed by the flange 326 to move in the longitudinal direction as well.

In a further embodiment, a shoulder 346 may be formed at the top of the secondary cut-off mechanism 340. The shoulder 346 is configured to cooperate with the flange 326 so as to realize the aforementioned driving action. In the illustrated embodiment, the shoulder 346 can be formed by making a portion at the top of the secondary cut-off mechanism 340 be recessed inwardly in the longitudinal direction and in the transverse direction. As shown in FIG. 2, when the flange 326 and the shoulder 346 contact and cooperate with each other, the top of the primary cut-off mechanism 320 can be substantially flush with the top of the secondary cut-off mechanism 340 in the transverse direction, such that the structure of the cut-off mechanism 30 can be more compact, which further saves the installation space and movement space required by the cut-off mechanism 30.

As mentioned above, the primary cut-off mechanism 320 slides along the secondary cut-off mechanism 340 in the longitudinal direction, and meanwhile, the primary cut-off mechanism 320 drives the secondary cut-off mechanism 340 in the longitudinal direction, that is, the sliding direction is consistent with the driving direction. Advantages of such an arrangement lie in that, at the same time of realizing multiple point cutoff and sequential cutoff, the structure of the cut-off mechanism is simplified, and accuracy requirements of manufacturing, installation and operations of the cut-off mechanism are reduced.

In order to realize the operation of cutting off the conductor 10, the cut-off mechanism 30 can be provided with cutting portions. Specifically, the primary cut-off mechanism 320 can be provided with a primary cutting portion 328, and the secondary cut-off mechanism 340 can be provided with a secondary cutting portion 348. In the primary operation phase, the primary cutting portion 328 is configured to cut off the conductor 10 at a primary cut-off point 110 of the conductor 10. In the secondary operation phase, the secondary cutting portion 348 is configured to cut off the conductor 10 at secondary cut-off points 120 of the conductor 10. In general, the primary cut-off point 110 and the secondary cut-off points 120 are spaced apart relative to each other.

According to some embodiments of the present application, the housing 20 of the circuit breaker 1 may be provided with an actuation cavity 220 and an operation cavity 240. In the illustrated embodiments, the housing 20 may be formed such that it has an open upper end and a closed lower end. Viewed in the longitudinal direction, the actuation cavity 220 is formed at a portion close to the upper end, and the operation cavity 240 is formed below the actuation cavity 220. The actuation cavity 220 and the operation cavity 240 may be communicated with each other.

The cut-off mechanism 30 is accommodated in the operation cavity 240. The conductor 10 extends through the operation cavity 240. As shown in the figures, the cut-off mechanism 30 in the operation cavity 240 is located in the longitudinal direction on one side of the conductor 10, that is, the primary cut-off mechanism 320 and the secondary shut-off mechanism 340 are located in the longitudinal direction on the same side of the conductor 10, which is consistent with the purpose of achieving desired compact structure in the present application.

The actuation mechanism 40 may be fixed in the actuation cavity 220 of the housing 20. Preferably, the actuation mechanism 40 is configured to close the open end of the housing 20, such that the assembled circuit breaker 1 is formed as a closed device.

The actuation mechanism 40 can be configured to generate a force applied to the primary cut-off mechanism 320 of the cut-off mechanism 30 to push the primary cut-off mechanism 320 to move in response to an actuation signal. The actuation signal may be a signal which indicates circuit failure or other situations in which it is required to break off the circuit. For example, in the case of circuit overload, an actuation signal will be sent to the actuation mechanism 40. The actuation mechanism 40 may be an optional suitable actuation mechanism in the art, such as an explosive actuator. In the case of receiving an actuation signal, the actuation mechanism 40 is activated to generate an explosive gas. The explosive gas flows from the actuation cavity 220 to the operation cavity 240 and acts on the top of the primary cut-off mechanism 320, thereby pushing the primary cut-off mechanism 320 to move downwardly in the longitudinal direction.

In some embodiments of the present application, the operation cavity 240 can be divided into at least two sections, such as a first section 242 and a second section 244 shown more clearly in FIG. 3. The first section 242 is configured to cooperate with the primary cut-off mechanism 320, such that in the primary operation phase, the primary cut-off mechanism 320 slides down in the longitudinal direction along an inner wall of the first section 242. The second section 244 is configured to cooperate with the secondary cut-off mechanism 340, such that in the secondary operation phase, the secondary cut-off mechanism 340 slides down in the longitudinal direction along an inner wall of the second section 244.

Both the inner wall of the first section 242 and the inner wall of the second section 244 extend in the longitudinal direction, such that the sliding direction of the primary cut-off mechanism 320 along the inner wall of the first section 242 is the same as that of the secondary cut-off mechanism 340 along the inner wall of the second section 244. Similarly, advantages of such an arrangement lie in that, at the same time of realizing multiple point cutoff and sequential cutoff, the structure of the cut-off mechanism is simplified, and accuracy requirements of manufacturing, installation and operations of the cut-off mechanism are reduced.

Operations of the circuit breaker 1 according to some embodiments of the present application will be described below with reference to accompanying drawings. FIGS. 1-3 show operations of the cut-off mechanism 30 in a primary operation phase and the secondary operation phase.

FIG. 1 shows a cut-off mechanism 30 in an initial position, wherein both the primary cutting portion 328 and the secondary cutting portion 348 are located above the conductor 10, and the primary cut-off mechanism 320 fits in a first section 242.

FIG. 2 shows the primary operation phase. After the actuation mechanism 40 receives an actuation signal, an explosive gas, for example, is generated. The explosive gas acts on the top of the primary cut-off mechanism 320 to push the primary cut-off mechanism 320 to slide downwardly in the longitudinal direction along the inner wall of the first section 242. Simultaneously, the primary cut-off mechanism 320 also slides downwardly in the longitudinal direction in the sliding chamber 342 of the secondary cut-off mechanism 340. With downward sliding of the primary cut-off mechanism 320 in the longitudinal direction, the primary cutting portion 328 of the primary cut-off mechanism 320 cuts off the conductor 10 at the primary cut-off point 110, so as to form a breaking point.

FIG. 3 shows the secondary operation phase. As the primary cut-off mechanism 320 continues to slide downwardly in the longitudinal direction, the flange 326 of the primary cut-off mechanism 320 contacts with and abuts against the top or the shoulder 346 of the secondary cut-off mechanism 340. With further sliding of the primary cut-off mechanism 320, the secondary cut-off mechanism 340 is driven by the flange 326 to slide downwardly in the longitudinal direction as well. In the process of downward sliding of the secondary cut-off mechanism 340, secondary cutting portions 348 of the secondary cut-off mechanism 340 cuts off the conductor 10 at the secondary cut-off points 120, so as to form further breaking points.

Figure 5:
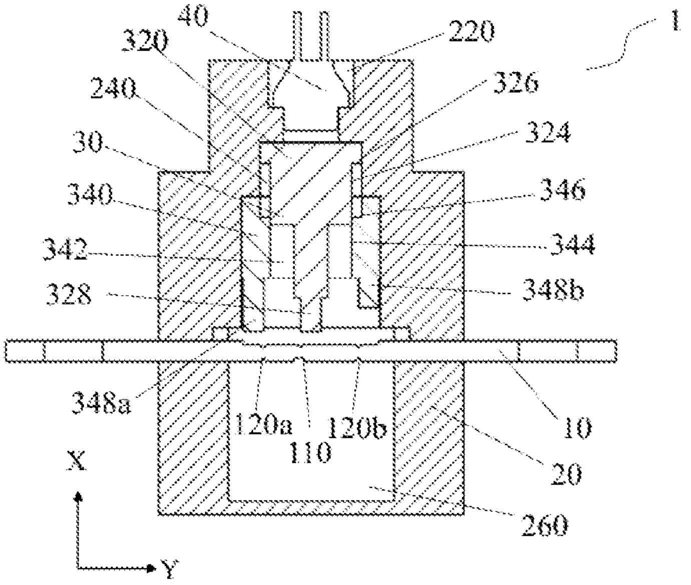
FIG. 5, which is sectional view of a circuit breaker according to another embodiment of the present application, shows a cut-off mechanism in an initial position.

FIGS. 5-8 show a circuit breaker 1 according to other embodiments of the present application. The difference of this circuit breaker 1, as compared with the circuit breaker 1 as shown in FIGS. 1-3, lies in that the secondary operation phase is further divided into a first secondary operation phase and a second secondary operation phase. To be brief, only differences as compared with the circuit breaker 1 above will be described below:

In this embodiment, the secondary cut-off mechanism 340 of the circuit breaker 1 is provided with a first secondary cutting portion **348*a* and a second secondary cutting portion 348*b*. Correspondingly, the conductor 10 is provided with a first secondary cut-off point 120*a* and a second secondary cut-off point 120*b*. As shown in FIG. 5, viewed in the longitudinal direction, the first secondary cutting portion 348*a* extends more than the second secondary shut-off mechanism 348*b*, such that in the downward sliding process of the secondary cut-off mechanism 340 in the longitudinal direction, the first secondary cutting portion 348*a* contacts with the first secondary cut-off point 120 firstly, and then the second secondary cutting portion 348*b* contacts with the second secondary cut-off point 120*b***.

Operations of the circuit breaker 1 according to other embodiments of the present application will be described below with reference to the accompanying drawings. FIGS. 5-8 show operations of a cut-off mechanism 30 in the primary operation phase and the secondary operation phase (including the first secondary operation phase and the second secondary operation phase).

Similar to FIG. 1, FIG. 5 shows the cut-off mechanism 30 located in an initial position, wherein both the primary cutting portion 328 and the secondary cutting portion 348 are located above the conductor 10, and the primary cut-off mechanism 320 fits in the first section 242.

Figure 6:
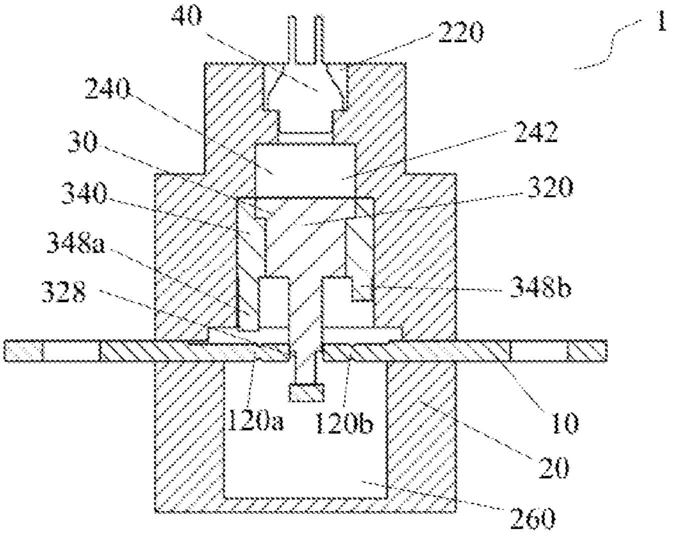
FIG. 6, which is a sectional view of a circuit breaker according to another embodiment of the present application, shows a primary operation phase.

Similar to FIG. 2, FIG. 6 shows the primary operation phase. After the actuation mechanism 40 receives an actuation signal, an explosive gas, for example, is generated. The explosive gas acts on the top of the primary cut-off mechanism 320, so as to push the primary cut-off mechanism 320 to slide downwardly in the longitudinal direction along the inner wall of the first section 242. Simultaneously, the primary cut-off mechanism 320 also slides downwardly in the longitudinal direction in the sliding chamber 342 of the secondary cut-off mechanism 340. With the downward sliding of the primary cut-off mechanism 320 in the longitudinal direction, the primary cutting portion 328 of the primary cut-off mechanism 320 cuts off the conductor 10 at the primary cut-off point 110, so as to form a breaking point.

Figure 7:
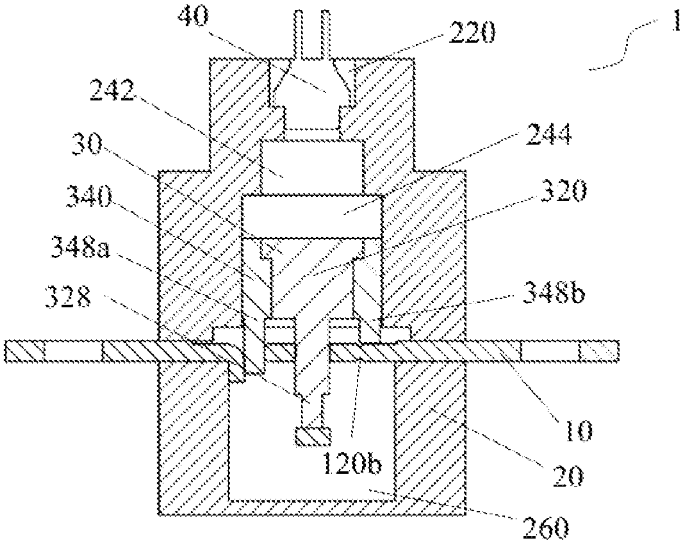
FIG. 7, which is a sectional view of a circuit breaker according to another embodiment of the present application, shows a first secondary operation phase.

FIG. 7 shows the first secondary operation phase. As the primary cut-off mechanism 320 continues to slide downwardly in the longitudinal direction, the flange 326 of the primary cut-off mechanism 320 contacts with and abuts against the top or the shoulder 346 of the secondary cut-off mechanism 340. With further sliding of the primary cut-off mechanism 320, the secondary cut-off mechanism 340 is driven by the flange 326 to slide downward in the longitudinal direction as well. In the process of downward sliding of the secondary cut-off mechanism 340, the first secondary cutting portion **348*a* of the secondary cut-off mechanism 340 cuts off the conductor 10 at the first secondary cut-off point 110*a***, so as to form another breaking point.

Figure 8:
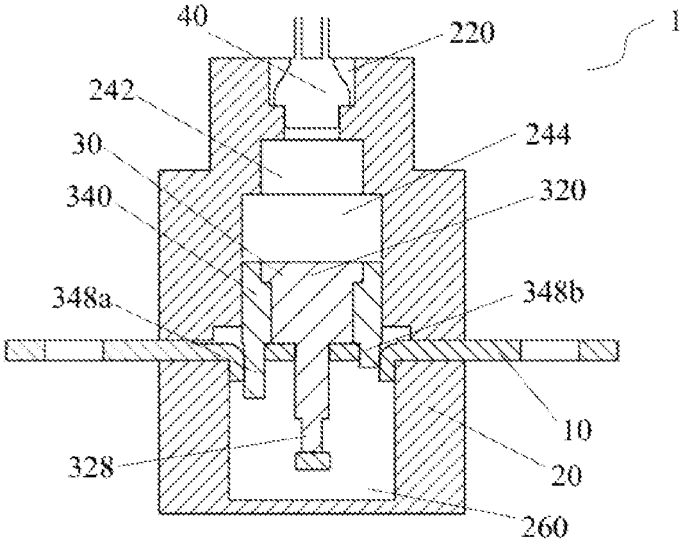
FIG. 8, which is a sectional view of a circuit breaker according to another embodiment of the present application, shows a second secondary operation phase.

FIG. 8 shows the second secondary operation phase. In the process that the secondary cut-off mechanism 340 is driven by the primary cut-off mechanism 320 to continue to slide downwardly, the second secondary cutting portion **348*b* of the secondary cut-off mechanism 340 cuts off the conductor 10 at the second secondary cut-off point 110*b***, so as to form another breaking point.

In some embodiments of the present application, the housing 20 can further be provided with an accommodation space 260, as shown in FIG. 1. The accommodation space 260 is used for receiving impurities such as debris cut from the conductor 10 by the cut-off mechanism 30.

For low power applications, the aforementioned three-cutouts circuit breaker 1, which has sufficient arc extinguishing capacity, has already been able to satisfy application requirements. For high power applications, arc extinguishing requirements need to be further improved. In this case, the circuit breaker 1 can be connected in parallel with a fuse body 150 to strengthen arc extinguishing capacity of the circuit breaker 1.

Figure 4:
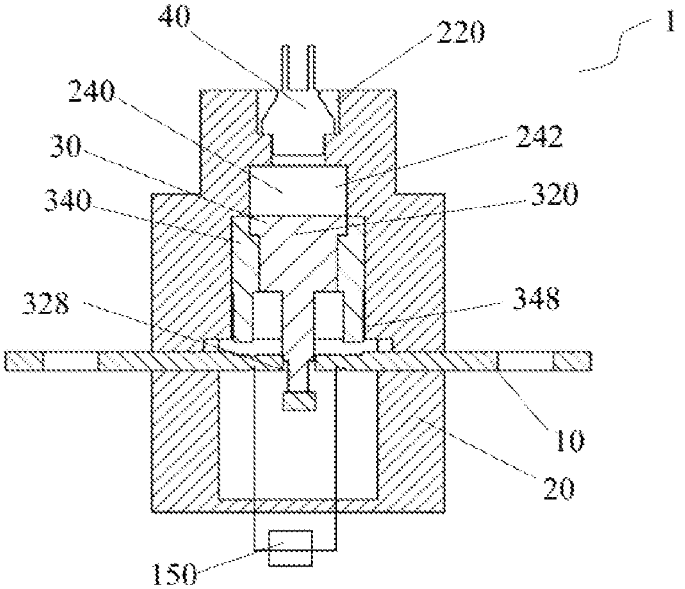
FIG. 4, which is a sectional view of a circuit breaker according to one embodiment of the present application, shows a fuse body connected in parallel across a primary cut-off point.

As shown in FIG. 4, a fuse body 150 may be connected in parallel across the primary cut-off point 110 of the conductor 10. When the primary cutting portion 328 cuts off the conductor 10 at the primary cut-off point 110, the circuit is still connected via the fuse body 150. However, due to high current in the circuit, the fuse body 150 will fuse, to break off the circuit. Addition of the fuse body 150 significantly improves the arc extinguishing capacity of the circuit breaker 1, such that the circuit breaker 1 can be applied in high power situations without risk.

Figure 9:
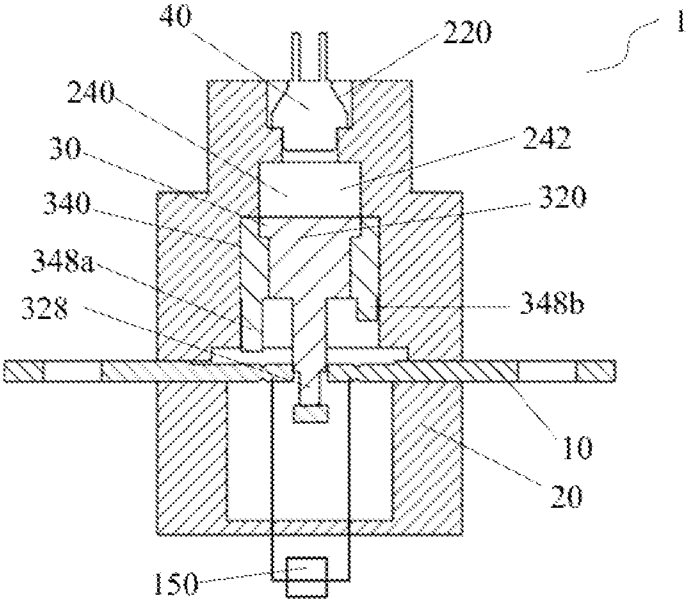
FIG. 9, which is a sectional view of a circuit breaker according to another embodiment of the present application, shows a fuse body connected in parallel across a primary cutout point.
Figure 10:
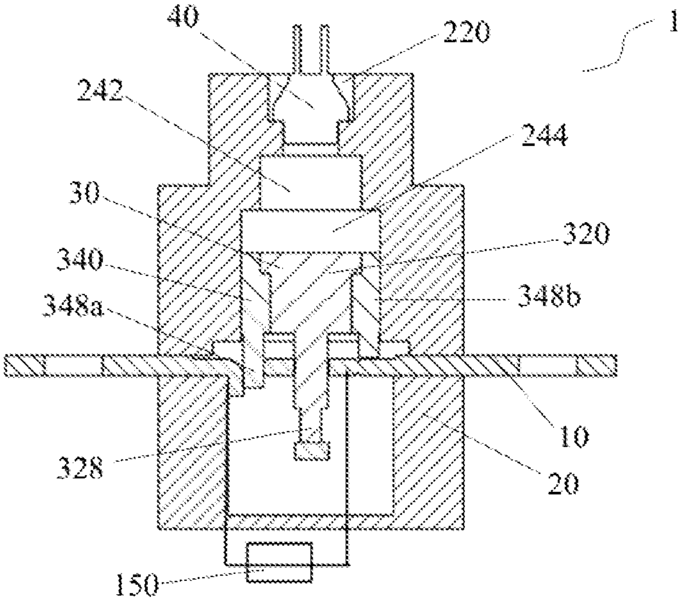
FIG. 10, which is a sectional view of a circuit breaker according to another embodiment of the present application, shows another parallel connection form of a fuse body.

FIGS. 4 and 9 show a fuse body 150 connected in parallel across the primary cut-off point 110, wherein no secondary cut-off point is provided. As shown in FIG. 10, a fuse body 150 is connected in parallel across the primary cut-off point 110 and one secondary cut-off point 120, and such an arrangement can also improve arc extinguishing capacity of the circuit breaker 1 significantly. Although now shown, it can be though of by a person skilled in the art that the fuse body 150 can also be connected in parallel in other positions, such as across the primary cut-off point 110 and two secondary cut-off points 120, which can improve arc extinguishing capacity of the circuit breaker 1 significantly as well.

Although exemplary embodiments of the present application have already been described, those skilled in the art should understand that the exemplary embodiments of the present application can change and be modified without departing from the scope and spirit of the present application. Thus, all such changes and modifications fall into the protection scope of the present application defined in the claims. The present application is defined by attached claims and equivalent substitution of the claims.

The invention claimed is:

1. A circuit breaker, comprising a cut-off mechanism configured to cut off a conductor extending through the circuit breaker, characterized in that, the cut-off mechanism comprises a primary cut-off mechanism and a secondary cut-off mechanism, the primary cut-off mechanism is provided with a primary cutting portion; and the cut-off mechanism comprises:

a primary operation phase in which the primary cut-off mechanism slides along the secondary cut-off mechanism and the primary cutting portion cuts off the conductor at a primary cut-off point of the conductor; and a secondary operation phase in which the primary cut-off mechanism drives the secondary cut-off mechanism to move.

2. The circuit breaker according to claim 1, characterized in that, the secondary cut-off mechanism is provided with a sliding chamber, and in the primary operation phase, the primary cut-off mechanism slides in the sliding chamber.

3. The circuit breaker according to claim 1, characterized in that, the primary cut-off mechanism is provided with a sliding surface and the secondary cut-off mechanism is provided with a sliding surface, and in the primary operation phase, the sliding surface of the primary cut-off mechanism slides along the sliding surface of the secondary cut-off mechanism.

4. The circuit breaker according to claim 1, characterized in that, a direction in which the primary cut-off mechanism slides along the secondary cut-off mechanism is consistent with a direction in which the primary cut-off mechanism drives the secondary cut-off mechanism.

5. The circuit breaker according to claim 1, characterized in that, one end of the primary cut-off mechanism is provided with a flange, and one end of the secondary cut-off mechanism is provided with a shoulder, wherein in the secondary operation phase, the flange abuts against and pushes the shoulder so that the primary cut-off mechanism drives the secondary cut-off mechanism.

6. The circuit breaker according to claim 1, characterized in that, a fuse body is connected in parallel across the primary cut-off point of the conductor.

7. The circuit breaker according to claim 1, characterized in that, the secondary cut-off mechanism is provided with a secondary cutting portion, wherein in the secondary operation phase, the secondary cutting portion cuts off the conductor at secondary cut-off points of the conductor.

8. The circuit breaker according to claim 1, characterized in that, the secondary operation phase includes a first secondary operation phase and a second secondary operation phase, and the secondary cut-off mechanism is provided with a first secondary cutting portion and a second secondary cutting portion, wherein in the first secondary operation phase, the first secondary cutting portion cuts off the conductor at a first secondary cut-off point of the conductor, and in the second secondary operation phase, the second secondary cutting portion cuts off the conductor at a second secondary cut-off point of the conductor.

9. The circuit breaker according to claim 1, characterized in that, the circuit breaker comprises a housing provided with an actuation cavity and an operation cavity, wherein the conductor extends through the operation cavity.

10. The circuit breaker according to claim 9, characterized in that, the cut-off mechanism is accommodated in the operation cavity, wherein the primary cut-off mechanism and the secondary cut-off mechanism are located on the same side of the conductor.

11. The circuit breaker according to claim 9, characterized in that, an actuation mechanism is accommodated in the actuation cavity and configured to generate a force applied to the primary cut-off mechanism of the cut-off mechanism to push the primary cut-off mechanism to move in response to an actuation signal.

12. The circuit breaker according to claim 9, characterized in that, the operation cavity comprises a first section and a second section, wherein in the primary operation phase, the primary cut-off mechanism slides along an inner wall of the first section, and in the secondary operation phase, the secondary cut-off mechanism slides along an inner wall of the second section.

13. The circuit breaker according to claim 12, characterized in that, a direction in which the primary cut-off mechanism slides along the inner wall of the first section is consistent with a direction in which the secondary cut-off mechanism slides along the inner wall of the second section.

* * * * *